Figure 1:
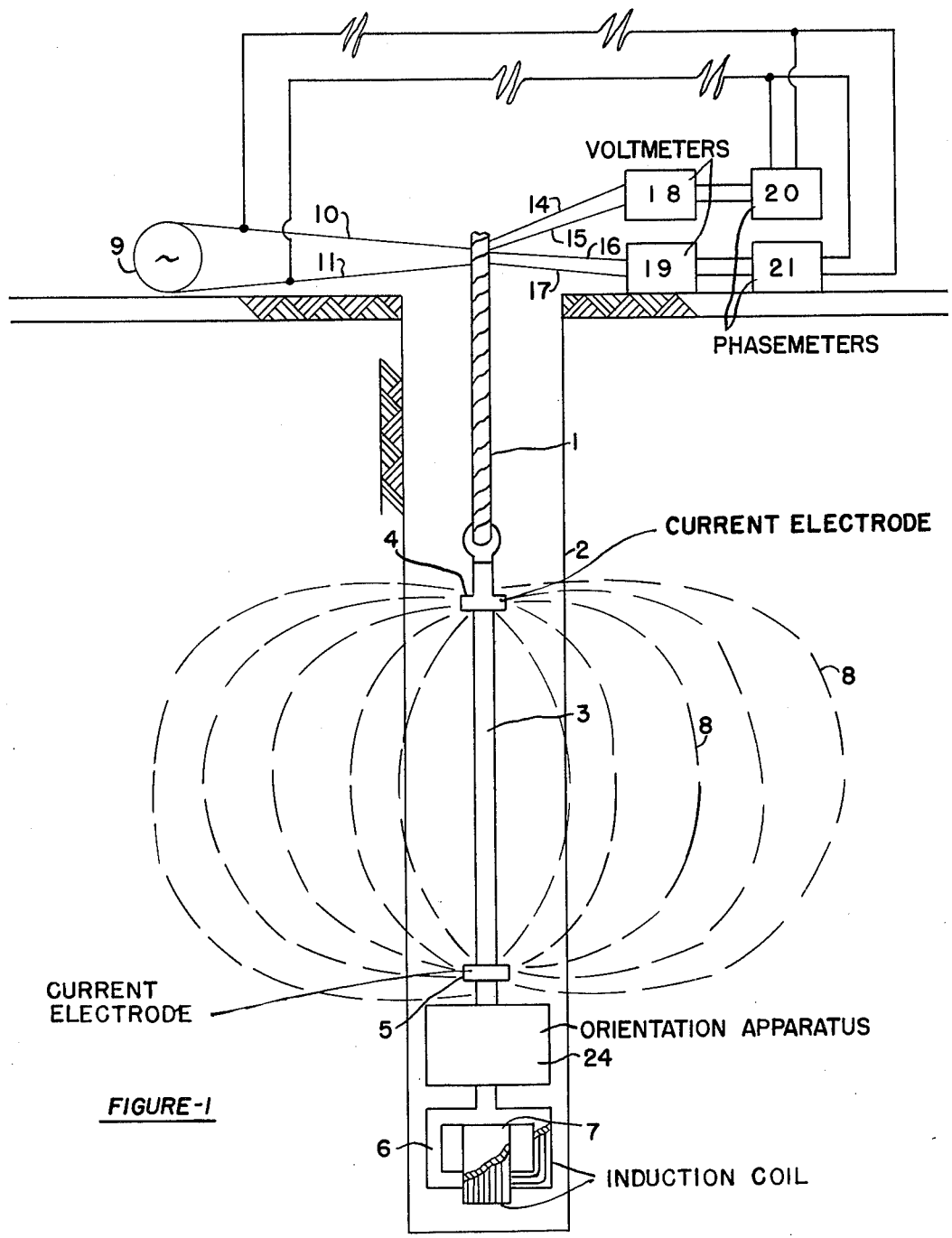

United States Patent Office 2,723,374
Patented Nov. 8, 1955

2,723,374

ELECTROMAGNETIC PROSPECTING FROM BORE HOLES

Philip S. Williams, Tulsa, Okla., assignor to Esso Research and Engineering Company, a corporation of Delaware Application April 9, 1953, Serial No. 347,685

10 Claims. (Cl. 324—1)

This invention concerns a technique of electromagnetic exploration of the earth conducted from bore holes drilled into the earth. The invention permits lateral exploration from a bore hole in order to determine the magnitude and direction of resistive anomalies in the earth.

The present invention relates to the techniques generally called electrical well logging. In electrical well logging a variety of electric arrangements are employed in a bore hole so as to determine variations in electrical values along the length of a bore hole. Presently known electrical well logging methods are primarily adapted for providing information as to the nature of the earth in the immediate vicinity of a bore hole. It has recently become appreciated that additional information of real value in prospecting could be obtained if electrical well logging methods can be extended to encompass extensive lateral areas of the earth about the bore hole. This invention is concerned with the provision of a novel method and apparatus for achieving this objective.

While as indicated, the desirability of developing a lateral exploration technique from bore holes has been appreciated, all of the difficulties involved in such a prospecting method have not yet been reasonably solved. Suggestions which have heretofore been made are characterized by a number of deficiencies. By way of example, the lateral electrical prospecting methods heretofore known require the use of rather complicated electrode arrangements. In some of the methods proposed it is necessary to position electrode arrays at or adjacent the surface of the earth at substantial distances from the bore hole. Repetitive passage of other electrodes through the bore hole is then required, while changing the azimuthal orientation of the electrical array on the surface of the earth. It may therefore be stated as a more specific object of this invention to provide a prospecting method which minimizes the time, expense and effort required to obtain significant lateral prospecting information. This invention accomplishes this objective by utilizing apparatus which is concentrated at or in the bore hole and which can provide all required information in a single pass of the apparatus through the bore hole.

The process of this invention necessitates the maintenance of a particular type of electrical current distribution within the earth about a bore hole. An induction coil assembly is positioned in the bore hole so as to maintain a critical relationship to the electrical current pattern referred to. The induction coil assembly serves to detect the magnitude and direction of any significant resistive anomalies in the earth within the electrical current pattern developed. Resistive anomalies which may be located by this method include ore bodies, salt domes, reefs, or dipping strata having a conductivity which is different from the conductivity of adjacent beds. This basic information is of utility in conjunction with geological information, conventional well logging results, etc., to determine the probable location of mineral deposits and for other purposes.

In order to understand the nature and principles of this invention, it is desirable to consider a basic electrode and coil arrangement. For this purpose consider that two electrodes are positioned in a vertical bore hole at a substantial spacing with respect to each other. If low frequency voltage is provided to these electrodes, an A. C. electrical current will be passed through the earth in the vicinity of the bore hole. As will be developed, dependent on the separation of the electrodes, the frequency of the voltage employed, and other factors, this electrical current can be made to extend over considerable lateral areas in the earth. Assume now that a helical induction coil is positioned below the electrodes in the bore hole, the axis of the coil being horizontal. In considering the nature of voltages induced in this coil by virtue of the electrical current developed by the electrodes, it is desirable to refer to a vertical plane passing through the axis of the coil. In other words, the axis of the coil lies totally within the vertical plane. If the electrical current pattern on one side of this reference vertical plane is identical with that on the other, as in a homogeneous earth, the alternating magnetic field parallel to the coil axis will be effectively zero. Then the voltage induced in the coil will be zero. The magnetic field referred to is zero because the regions on either side of the plane contribute equal and opposite components.

However, if there is any substantial resistive inhomogeneity in the earth on either side of the reference plane, this balance will not exist, an alternating magnetic vector parallel to the coil axis will result, and a voltage will be induced in the coil having a magnitude and polarity dependent on the extent and nature of the resistive anomaly and on the orientation of this anomaly with respect to the reference plane considered.

It is important to observe that the induction coil positioned as described is directionally sensitive to any resistive anomalies in the earth. The induction coil is sensitive to lack of symmetry in the earth's conductive properties across a vertical plane passing through the axis of the coil. The induction coil is insensitive to such a lack of symmetry across a vertical plane passing through the coil windings and normal to the coil axis. As a result it becomes possible to employ an induction coil or coils in conjunction with the general electrode arrangement described so as to uniquely fix the azimuthal orientation of resistive anomalies. This is most conveniently attained by employing a first and second induction coil, each of which is supported in the manner described, but so that the axes of the two coils define an angle with respect to each other. In the preferred case the two horizontal axis coils are positioned so the axes of the coils define an angle of 90° with respect to each other. For practical reasons the pair of coils employed should have about the same electrical characteristics. When employing a pair of coils arranged in this manner, the direction of a resistive anomaly in the earth may be obtained by determining the phases and relative magnitudes of voltages induced in the coils. Similarly, the magnitude and distance away of a resistive anomaly is related to the magnitudes of the voltages induced in the two coils.

Stated more precisely, the measurements of amplitudes and phases (relative to the current in the current electrodes) of the coil voltages, serve to determine the amplitude, phase (relative to electrode current), and direction (relative to the coil axes) of the alternating horizontal magnetic vector resulting from a conductivity asymmetry in the earth. How this is carried out will be readily apparent to those skilled in the art. The interpretation of this directional information requires, of course, that the orientation of the coils be known.

To illustrate, suppose the voltage and phase measurements, coupled with the known coil orientation, indicate that the alternating magnetic vector lies due north and south, and that its phase is such that it points north when the current is flowing from the upper current electrode to the lower. It can then readily be seen that this condition can be accounted for by having a larger earth current flowing in the region west of the vertical north-south plane than in the region east of it. This could mean an anomalous conductivity increase westerly, or conversely an anomalous decrease easterly, or both.

It follows from the above explanation and illustration that what is determined is actually a sort of resistivity gradient in the general region of the bore hole. The geological interpretation of such a gradient will depend on circumstances. For example, if limestone reefs (low conductivity) projecting upward into shale (higher conductivity) are expected, a directional indication toward lower conductivity may well indicate that a potentially oil-productive reef may lie in that direction.

With this description of the basic principles on which this invention depends the detailed techniques of the invention can be appreciated with reference to the accompanying drawings. In these drawings:

Figure 1 diagrammatically illustrates a basic arrangement of induction coils and electrodes employed in the electromagnetic prospecting method.

Figure 2:
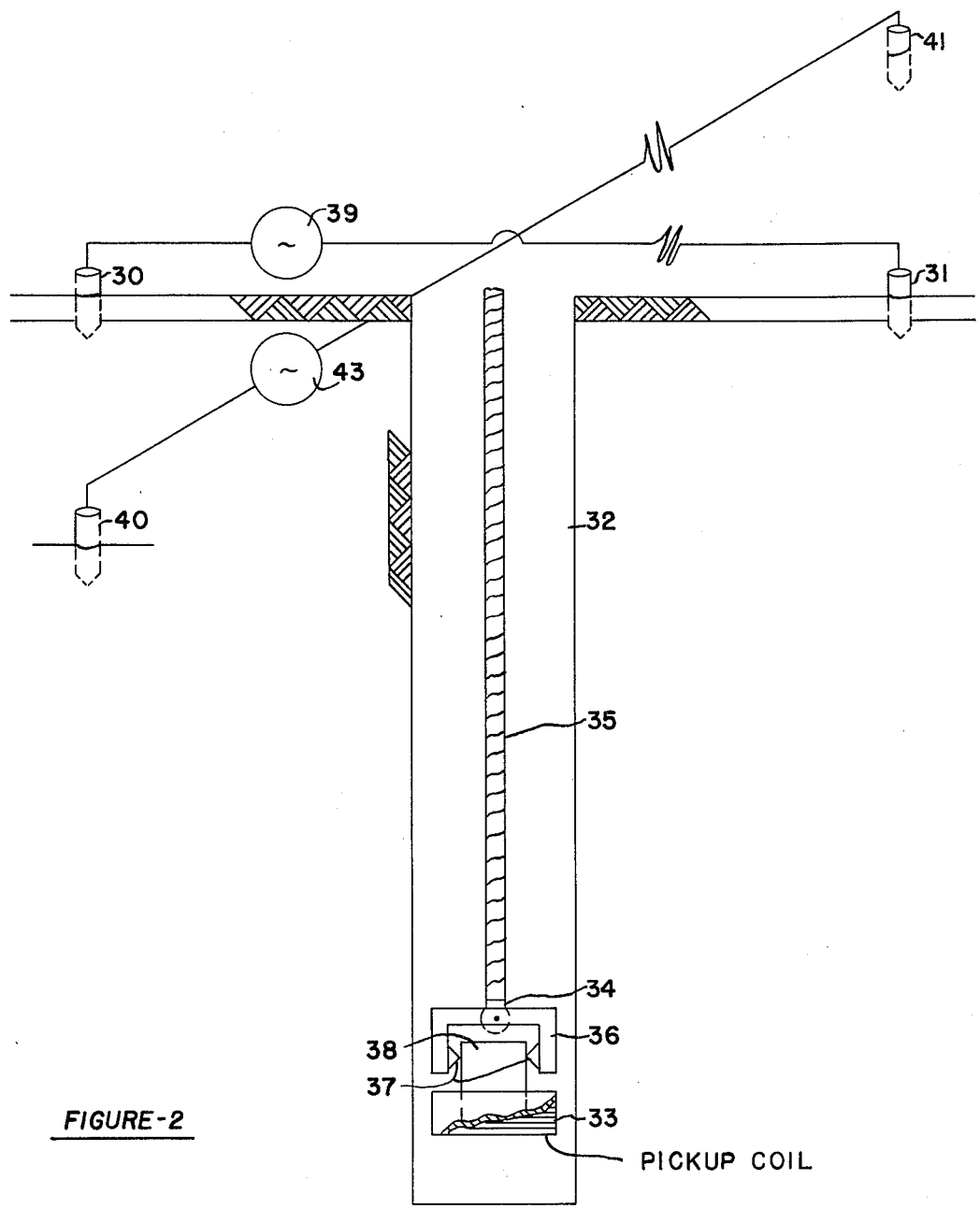

Figure 2 diagrammatically illustrates another coil and electrode arrangement embodying the general principles of this invention to provide additional lateral prospecting information.

Referring to Figure 1, the numeral 2 designates a bore hole which has been drilled into the earth. Suspended within the bore hole are the essential components of the apparatus to be employed, including a longitudinal support member 3 suspended in the bore hole by means of the cable 1. As will be developed, the support member 3 must be relatively long so that the electrodes and induction coils carried by the support member may be substantially spaced within the bore hole. At the upper end of support member 3 a first electrode 4 may be positioned. A second electrode 5 is maintained at an intermediate location on the long support member. A pair of induction coils 6 and 7 may be fixed to the lower end of the support member. The electrodes 4 and 5 may be of conventional axially-symmetric construction. For diagrammatic purposes dashed lines 8 representing paths of current flow between the electrodes are illustrated.

A suitable source of voltage for the electrodes 4 and 5 is illustrated by A. C. generator 9 which is connected to electrodes 4 and 5 through conductors 10 and 11 passing through the supporting cable 1. For the purposes of this invention, it is essential that generator 9 constitute a source of low frequency alternating current. It is only by using low frequency current alternations that an electrical current can be established which encompasses extensive lateral areas. High frequency A. C. current fields developed by the electrodes would be confined in the bore hole or the immediate vicinity of the bore hole due to what is known as skin effects. However, too low a frequency renders the pickup coils inefficient. A practical range of frequency is, say 5 to 25 cycles per second. Alternatively, it is practical to employ what has been known as commutated D. C. current in the practice of this invention. As this term is used, the polarity of both a D. C. source connected to the current electrodes and the polarity of recording circuits associated with the induction coils are both periodically reversed. The commutation frequency should be about the same as the alternating frequency described above.

The magnitude of the energizing current supplied to the electrodes should be as large as feasible. Currents of 5 to 10 amperes are practically satisfactory. By the provisions set forth it becomes practical to establish an earth current pattern around the electrodes 4 and 5 which extends laterally from the bore hole for a distance of the order of the displacement of the two electrodes. It is apparent from this that for extensive lateral prospecting electrodes 4 and 5 must be substantially spaced. As will be developed electrode arrangements differing from that shown in Figure 1 may be used to aid in obtaining the greatest lateral extension of the electromagnetic field.

In accordance with the general principles formerly identified, the coils 6 and 7 are positioned on and by support member 3 in a fixed position relative to the electrodes 4 and 5. As illustrated, the axis of each of the coils 6 and 7 is normal to the axis of support 3. In other words the axis of each of the coils 6 and 7 is normal to a line passing through the electrodes 4 and 5. The coils 6 and 7 are so positioned that the axes of the coils and the planes of the coil windings define an angle of 90°. It will be understood that the planes of the coil windings of the two coils could be maintained at any substantial angle, but a 90° relationship simplifies the interpretation of data from the coils.

It would theoretically be possible to position coils 6 and 7 above the two electrodes 4 and 5 or even spaced between the electrodes 4 and 5. This is practically undesirable however. If the coils were to be positioned above either of the electrodes, these coils would then be exposed to any electromagnetic field developed by the flow of current through the electrode cable. Because of the low frequency of the currents employed, it would be very difficult to effectively shield or position the electrode cables to prevent inducing undesired currents in the induction coils. It is highly desirable therefore that as described the induction coil assembly be positioned below the electrodes employed.

The essential electrical equipment to be employed with the induction coils is diagrammatically illustrated at the surface of the earth. Conductors 14 and 15 from coil 6, passing to the surface of the earth through cable 1, are connected to a sensitive meter for determining the magnitude of voltage induced in coil 6. Similarly, conductors 16 and 17 connected to coil 7 are connected to a voltage measuring device. It is also necessary to connect the coils 6 and 7 to suitable devices to determine the phase of voltages induced in the coils. The necessary phase information indicates the direction of induced voltage in each of the induction coils relative to that of the exciting earth current. It is only necessary therefore to employ simple phase discriminators operative to identify 0° and 180° phase relations for each of the coils. Suitable apparatus is diagrammatically illustrated by numerals 20 and 21 identified as phase meters.

One additional element is required in the apparatus described. It is essential that information be obtained as to the azimuthal orientation of the induction coils during prospecting. Thus it is necessary to know the compass direction of the axes of the induction coils. This information can practically be obtained in various ways. For example, the induction coils may be supported by means of a swivel connection permitting 360° of rotational movement between support 3 and the induction coils. A gyroscope can then be coupled to the induction coils so as to maintain these coils in an orientation relationship which is established when the gyroscope is started and the appaartus is lowered from the surface of the earth. In this fashion the gyroscope can be relied upon, for example, to maintain coil 6 in north-south alignment. Coil 7 will therefore be in fixed east-west alignment. Information from the phase meters 20 and 21 as to the phase of currents induced in these coils coupled with the azimuthal orientation information will permit identifying the direction of any resistive anomalies.

The gyroscopic orientation of the induction coils suggested, while practical, is presently considered to be less desirable than the alternative solution illustrated in Figure 1. In the apparatus of Figure 1 a device called an orientation apparatus, identified by numeral 24, is positioned in fixed relation to coils 6 and 7. The orientation apparatus is of a character to provide information as to the compass orientation of the induction coils fixed thereto. Suitable orientation apparatus may be of the nature conventionally employed in other types of well logging or prospecting methods. For example, orientation apparatus of the character described in U. S. Patent No. 2,609,513, issued to Boucher et al., September 2, 1952, may be employed. Alternatively, for example, orientation apparatus of the character claimed in U. S. Patent No. 2,332,777, issued October 26, 1943, to Boucher may be used. Such orientation apparatus will provide a continuous record of azimuthal orientation of the induction coils as these coils are passed along the bore hole. It is thus unnecessary to maintain the coils in any fixed and invariable orientation.

While not illustrated in the drawing, it will be understood that the orientation apparatus described is used to pass electrical signals to the surface of the earth providing records which can be employed with the phase information of meters 20 and 21 to provide the essential data.

It is apparent that the apparatus described is subject to a great many modifications and refinements. For example, it is desirable to employ a pair of spring assemblies along support member 3. Such centering springs will ensure the alignment of the apparatus with the bore hole and eliminate minor fluctuations in the detected induced currents which would otherwise be encountered if the apparatus were permitted to oscillate in the bore hole. Again, for example, while the support member has been described as a rigid longitudinal bar, it is apparent that this support member could be articulated for use in bore holes which deviate from linearity.

While provisions of the character described are desirable to ensure linearity of the two electrodes and the induction coils, the invention may be practiced employing cable suspension for all elements. In this case induced voltages in the coils due to non-linearity of the elements, forced by deviating bore holes, can best be compensated for by reference to inclinometer surveys. Alternatively, down-the-hole inclinometer apparatus may be included as an element of the apparatus directly providing the information required to correct the detected voltages or variations due to misalignment of the electrodes and induction coils. In this connection it should be observed that as the apparatus is primarily employed for extensive lateral prospecting the distance between the two electrodes and the distance between the induction coils and either of these electrodes is relatively great. The overall spread, for example, may be of the order of about 100 meters or more. Practically, sufficient linearity of the different elements can be achieved even when cable supported, except in the case of seriously deviated well bores.

While the apparatus has been described as employing two induction coils, it is apparent that the invention could be practiced using a single coil. In this case repetitive passes through the bore hole would be required in a manner to obtain information with the single coil in two different orientations.

The arrangement of the electrodes and electrode coils illustrated in Figure 1 is largely used for exemplary purposes. A variety of other arrangements may be used within the scope of this invention. For example, it is desirable and practical in attaining the greatest lateral penetration during prospecting, to position one of the electrodes employed at the surface of the earth immediately adjacent the well bore or in the well bore. The remaining electrode and the coils, maintained in a fixed spacing as described, may then be passed through the bore hole. In this arrangement it will be observed that as the electrode and coil is lowered into a bore hole, the spacing between the two electrodes becomes more extensive, thereby the lateral penetration of the resulting electromagnetic field in the earth is maximized.

Again, for example, both of the electrodes employed may be held in a fixed position in the bore hole while the coil is lowered through the bore hole below the electrode. This arrangement has the advantage of simplifying the cable requirements since the conductors carrying the large electrode currents would only have to extend to the electrodes which could be held relatively near the surface. Since the conductors leading to the induction coils would not have to carry large currents some saving in equipment cost can therefore be obtained.

The principles of this invention can be extended to electrode and coil arrangements of other types. One such variation of the invention is illustrated in Figure 2. In the arrangement of Figure 2 a pair of electrodes 30 and 31 are positioned at or adjacent the earth's surface and spaced at substantial distances from a bore hole 32 but in alignment therewith. In order to secure an extensive current pattern in the earth, electrodes 30 and 31 may be spaced from the bore hole at distances of about several thousand feet from the bore hole. In this arrangement an induction coil assembly of the character illustrated in the sole apparatus required as down-the-hole equipment. Thus an induction coil 33 is employed. It will be noted at this point that coil 33 is to be considered as in Fig. 1 to possess suitable conductors and means for measuring the magnitude as well as the phase of any voltage that may be induced in the coil. These features have not been included in Fig. 2 primarily in order to simplify the description of the figure. Coil 33 must be positioned in the bore hole so that at all times the axis of this coil is reasonably near vertical. A gimbal arrangement of the general character illustrated may conveniently be used for this purpose. Thus a pivot support 34 is carried by cable 35. A yoke arrangement 36 may be pivoted to support 34. Yoke 36 is provided with needle bearings 37, in turn supporting coil support 38. The mass of the coil suspended in this arrangement will serve to maintain the coil in the desired alignment at all times.

Employing the apparatus of Figure 2, a commutated D. C. current or low frequency A. C. current is supplied to the electrodes by means of source 39. Induction coil 33 will then detect any asymmetry in the horizontal current pattern established through the earth on either side of the vertical plane passing through the bore hole and the electrodes. The apparatus will be insensitive to any current pattern asymmetry about the vertical plane through the bore hole and normal to the line between the electrodes. Thus, like the arrangement of Figure 1, the system is directional in character. Thereby to obtain complete information on the orientation of any resistive anomalies in the earth, it becomes necessary to employ an additional electrode arrangement at the surface of the earth or to rotate the electrode arrangement described. Thus, for example, a second pair of electrodes 40 and 41 may be employed which are supplied with alternating voltage from source 43. Again electrodes 40 and 41 will be aligned with the bore hole and spaced from the bore hole at the same distance as electrodes 30 and 31. In the simplest case, the two pairs of electrodes may be positioned along orthogonal radii from the bore hole. By sequentially using each of these pairs of electrodes as described, at each level in the bore hole at which information is desired, information will be obtained as to the azimuthal orientation of any resistive anomalies in the region of the bore hole. For simplicity, in the drawing of Figure 2, the current and phase instruments to be employed with the induction coil have not been illustrated. It will be understood however that these elements are of the same nature as employed in Figure 1. However it may be observed that in the apparatus of Figure 2 a single current meter and phase meter may be employed with the induction coil provided sequential logs of the bore hole are employed with the two electrode patterns described.

The apparatus illustrated in Figure 2 may also be employed in a different and desirable manner to determine fluctuating vertical magnetic fields due to the fluctuating horizontal natural earth currents. In this use of the invention, current is not supplied to the electrodes described but instead the potential differences between the electrodes are determined as functions of time. This will provide information as to the magnitude and direction of the alternating components of the horizontal earth currents at the surface at all times. It may be assumed that the horizontal earth current within the earth is roughly parallel and proportional to that near the surface. Voltage induced in the induction coil 33 will then be the result of fluctuations in the vertical magnetic field established by natural earth currents. The induced voltage of the induction coil is therefore compared with the amplitude and phase of the alternating component of the horizontal natural potential gradient as measured with the electrode array described.

One further modification of this invention is particularly notable. As described, it is the basic purpose of this invention to determine the magnitude and direction of resistive anomalies in the earth by directional detection of electromagnetic fields in the earth. In the arrangements described induction coils are employed for this purpose. It is apparent, however, that in place of induction coils, spaced electrodes could be used. For example, in the general apparatus arrangement of Figure 1 induction coil 6 could be replaced by a pair of electrodes positioned adjacent the bore hole wall along a line normal to the axis of the bore hole. Similarly induction coil 7 could be replaced by a second pair of electrodes so that the two pairs of electrodes are arranged 90° apart about the axis of the bore hole. The conditions causing the transverse magnetic fields described will also cause a small potential gradient across the bore hole which can be detected by this electrode arrangement. Therefore measurements of the phase and amplitude of voltages across the two pairs of electrodes, in conjunction with information as to the electrode orientation, according to the general principles described, will indicate the magnitude and direction of resistive phenomena.

In this arrangement it is apparent that the electrodes should be spaced apart as far as possible within the bore hole. It is also desirable that the electrodes be of substantial length along the bore hole and they can be fairly wide horizontally up to 15° or 20° of arc. This construction decreases the electrode-ground-electrode impedance and permits use of a transformer step-up of the detected voltages, if desired, before amplification and recording.

It should be observed, that when employing this invention, movement of any of the apparatus elements must be terminated while taking readings. With the delicate instruments employed, interfering currents would otherwise be induced due to passage through the natural earth potential field.

What is claimed is:

1. An electro-magnetic prospecting method conducted from a bore hole which comprises the following steps: positioning at least one pair of spaced electrodes symmetrically and radially opposite with respect to the bore hole, supplying a low frequency, alternating voltage to the electrodes whereby an electro-magnetic field is set up in the earth surrounding the bore hole, maintaining at least one helical induction coil in the bore hole vertically below and spaced from said electrodes whereby the axis of each such coil lies in a vertical plane passing through each pair of said electrodes, detecting and indicating the directional orientation of each said coil, detecting and measuring the voltage and the phase of the voltage which is induced in each coil by the electro-magnetic field, the phase of the voltage being determined relative to the voltage supplied to the electrodes.

2. A method as defined in claim 1 in which a single pair of electrodes is positioned at the earth's surface in diametrically spaced relationship with respect to the bore hole and a single coil is maintained in the bore hole with the axis of the coil being substantially vertical.

3. A method as defined in claim 2 in which a second pair of electrodes is positioned at the earth's surface, the two pairs of electrodes being positioned along orthogonal radii from the bore hole.

4. A method as defined in claim 3 in which each of the pairs of electrodes is used sequentialy at each desired level in the bore hole.

5. A method as defined in claim 1 wherein a single pair of electrodes is positioned along the center line of the bore hole in vertically spaced relationship and a single coil is maintained in the bore hole with the axis of the coil being normal to the center line of the bore hole, and wherein measurements of the magnitude and the phase of the induced voltage are made with the axis of the coil in two different azimuthal orientations at each desired level in the bore hole.

6. An electro-magnetic prospecting method conducted from a bore hole which comprises positioning two spaced electrodes along the vertical center line of the bore hole, supplying a low frequency, alternating voltage to the electrodes whereby an electro-magnetic field is generated in the earth surrounding the bore hole, maintaining two separate helical induction coils below and vertically spaced from both said electrodes such that the axis of each coil lies completely within a vertical plane passing through both of the electrodes, maintaining the axes of said coils substantially horizontal and at a lateral angle relative to one another whereby the vertical planes through said axes are separated by said angle, detecting and indicating the azimuthal orientation of each said coil, detecting and measuring the voltage and the phase of the voltage that is induced in each said coil by the electro-magnetic field, the phase of each such voltage being determined relative to the voltage which is supplied to the electrodes.

7. A method as in claim 6 in which the axes of the coils are maintained at about 90° relative to one another.

8. An electro-magnetic surveying apparatus for use in prospecting operations conducted from a bore hole which comprises in combination: at least one pair of electrodes radially opposite from one another with respect to the bore hole and spaced substantially apart from one another, a source of low frequency alternating voltage electrically connected to said electrodes for generating an electro-magnetic field through the earth surrounding the bore hole, at least one induction coil, means to support each such coil vertically below and spaced from said electrodes, the axis of each such coil being in the same vertical plane as each pair of electrodes, means for indicating the directional orientation of the axis of each such coil, means for detecting and measuring the magnitude of the voltage which is induced in each such coil, and means for detecting and measuring the phase of the voltage in each coil relative to the voltage supplied to the electrodes.

9. An apparatus as defined in claim 8 in which a single pair of electrodes is positioned along the center line of the bore hole and two induction coils are supported below the electrodes, the axes of the coils being substantially horizontal and at right angles to each other.

10. An apparatus as defined in claim 8 in which the electrodes are horizontally spaced on the earth's surface and the axis of the coil is vertical.

References Cited in the file of this patent

UNITED STATES PATENTS

| | | |
|---|---|---|
| 1,902,265 | Rieber | Mar. 21, 1933 |
| 1,906,271 | Jakosky | May 2, 1933 |
| 2,108,463 | Zuschlag | Feb. 15, 1938 |